(12) United States Patent
Hoggatt

(10) Patent No.: US 12,210,930 B1
(45) Date of Patent: Jan. 28, 2025

(54) BARCODE-READING SYSTEM UTILIZING A MACHINE LEARNING MODEL THAT IS TRAINED TO PREDICT DECODABILITY OF AN IMAGE BY A BARCODE-DECODING MODULE

(71) Applicant: The Code Corporation, Murray, UT (US)

(72) Inventor: Denver Joseph Hoggatt, Bluffdale, UT (US)

(73) Assignee: THE CODE CORPORATION, Murray, UT (US)

( * ) Notice: Subject to any disclaimer, the term of this patent is extended or adjusted under 35 U.S.C. 154(b) by 71 days.

(21) Appl. No.: 18/314,644

(22) Filed: May 9, 2023

(51) Int. Cl.
*G06K 7/10* (2006.01)
*G06K 7/14* (2006.01)
*G06V 10/776* (2022.01)
*G06V 10/94* (2022.01)

(52) U.S. Cl.
CPC ....... *G06K 7/10722* (2013.01); *G06K 7/1413* (2013.01); *G06V 10/776* (2022.01); *G06V 10/95* (2022.01)

(58) Field of Classification Search
CPC .............. G06K 7/10722; G06V 10/766
USPC ..................................... 235/462.41
See application file for complete search history.

(56) References Cited

U.S. PATENT DOCUMENTS

2023/0196044 A1\* 6/2023 Hoetter ............... G06K 7/1417
235/462.1
2023/0367984 A1\* 11/2023 Zagaynov ................. G06T 5/40

\* cited by examiner

*Primary Examiner* — Toan C Ly
(74) *Attorney, Agent, or Firm* — Thomas M. Hardman

(57) ABSTRACT

A barcode-reading system utilizes a decodability machine learning model (MLM), which is configured to predict decodability of an image by a barcode-decoding module. A captured image is passed to the decodability MLM for processing before being passed to the barcode-decoding module. If the decodability MLM returns a decodability prediction which indicates that the image is likely to be decodable by the barcode-decoding module, then the image is passed to the barcode-decoding module. Conversely, if the decodability MLM returns a decodability prediction which indicates that the image is not likely to be decodable by the barcode-decoding module, then the image is discarded without being passed to the barcode-decoding module.

20 Claims, 8 Drawing Sheets

BARCODE-READING SYSTEM UTILIZING A MACHINE LEARNING MODEL THAT IS TRAINED TO PREDICT DECODABILITY OF AN IMAGE BY A BARCODE-DECODING MODULE

CROSS-REFERENCE TO RELATED APPLICATIONS

N/A

BACKGROUND

The present disclosure is generally related to barcodes and barcode-reading devices. The term "barcode" refers to an optical machine-readable representation of information. The term "barcode-reading device" refers to any device that is capable of identifying or extracting information from barcodes. The process of identifying or extracting information from a barcode can be referred to as reading (or scanning) a barcode. When a barcode is successfully read (or scanned) by a barcode-reading device, the information that is identified or extracted from the barcode can be referred to as decoded data.

An imaging-based barcode-reading device includes a camera for capturing one or more images of a barcode to be read. Once image(s) of a barcode have been captured by the camera, a barcode-decoding module processes the image(s) and attempts to decode (or, in other words, extract the information contained in) the barcode. As used herein, the term "barcode-decoding module" refers to any combination of software, firmware, and/or hardware that implements one or more barcode-decoding algorithms.

An imaging-based barcode-reading device can be a dedicated hardware device that is specifically designed for barcode reading. This type of device may be referred to as a dedicated barcode reader (or scanner). Alternatively, an imaging-based barcode-reading device can be a general-purpose computing device that includes a camera and that is equipped with software for reading barcodes. For example, mobile computing devices (e.g., smartphones, tablet computers) are frequently utilized for reading barcodes.

As used herein, the term "barcode-reading device" includes, but is not limited to, an imaging-based barcode-reading device.

As used herein, the term "imaging-based barcode-reading device" includes, but is not limited to, a dedicated barcode reader (or scanner). The term "imaging-based barcode-reading device" also includes, but is not limited to, a general-purpose computing device (e.g., a mobile computing device) that includes a camera and that is equipped with software for reading barcodes.

A barcode-decoding module can be configured to implement a plurality of different barcode-decoding algorithms. When the barcode-decoding module receives an image of a defective barcode that is difficult to decode (e.g., because the barcode is damaged or printed incorrectly), the barcode-decoding module can be configured to process the image using all of its barcode-decoding algorithms before giving up and determining that the barcode is not decodable. However, processing the image using all of its barcode-decoding algorithms can take a relatively long time (e.g., relative to how long it takes to decode a normal barcode). Benefits may be realized by techniques that would enable a barcode-decoding system to more quickly conclude that the barcode in the image is not decodable without requiring the barcode-decoding module to process the image using all of its barcode-decoding algorithms.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The present disclosure is generally related to the use of machine learning techniques to facilitate improvements in connection with barcode reading and decoding. Machine learning is a type of artificial intelligence that involves teaching computers to learn from data without being explicitly programmed. The machine learning process produces a machine learning model, which is an algorithm that has been trained on a dataset to make predictions or decisions about new data based on patterns and trends found in the training dataset. The performance of a machine learning model can improve over time as the machine learning model is exposed to additional data.

The present disclosure proposes the use of a machine learning model that is configured to predict decodability of an image by a barcode-decoding module. This type of machine learning model may be referred to herein as a decodability machine learning model (MLM).

In this context, the "decodability" of an image by a barcode-decoding module indicates whether or not the barcode-decoding module is able to find a barcode in the image and successfully decode the barcode. If a barcode-decoding module is able to find a barcode in an image and successfully decode the barcode, then the image is decodable by the barcode-decoding module. On the other hand, if a barcode-decoding module is unable to find a barcode in an image, or if a barcode-decoding module is able to find a barcode in an image but is unable to successfully decode the barcode, then the image is not decodable by the barcode-decoding module.

Broadly speaking, the techniques disclosed herein involve two phases: (i) a training phase, during which a machine learning model is trained to predict decodability of an image by a barcode-decoding module, thereby creating a decodability MLM, and (ii) a deployment phase, during which the decodability MLM is deployed in a barcode-decoding engine that includes a barcode-decoding module.

The training phase involves the use of images that have been processed by a barcode-decoding module and decodability labels corresponding to the images. A decodability label corresponding to a particular image can indicate decodability of the image by the barcode-decoding module. More specifically, the decodability label associated with a particular image can indicate whether the barcode-decoding module was able to find a barcode in the particular image and successfully decode the barcode. An image and its decodability label can be referred to collectively as an image record. Other metadata about an image can also be included in an image record.

A plurality of image records can be stored in an image data repository. The image records can be separated into a training set and a testing set. A training engine can use the image records from the training set to train an MLM to predict decodability of a new image by the barcode-decoding module. Once a certain amount of training has taken place, the performance of the MLM can be evaluated using the image records in the testing set. Once the performance of the MLM compares favorably to a performance metric, a deployment engine can deploy the MLM as a decodability MLM. After the decodability MLM has been deployed, the decodability MLM can be used to filter out images that are not likely to be decodable before those images are passed to the barcode-decoding module.

In some embodiments, the decodability MLM can be deployed as part of a barcode-decoding engine that includes the barcode-decoding module. The decodability MLM can be deployed in a pre-decoding filter module within the barcode-decoding engine. The decodability MLM can be configured so that, when an image is sent to the decodability MLM for processing, the decodability MLM returns a decodability prediction about the image. The decodability prediction for a particular image indicates whether the image is likely to be decodable by the barcode-decoding module.

When the barcode-decoding engine receives a captured image, the image can be passed to the pre-decoding filter module (which includes the decodability MLM) for processing before being passed to the barcode-decoding module. If the pre-decoding filter module returns a decodability prediction which indicates that the image is likely to be decodable by the barcode-decoding module, then the image can be passed to the barcode-decoding module. On the other hand, if the pre-decoding filter module returns a decodability prediction which indicates that the image is not likely to be decodable by the barcode-decoding module, then the image can be discarded without being passed to the barcode-decoding module.

Having a pre-decoding filter module with a decodability MLM that operates in this manner can be beneficial in a variety of scenarios. For example, consider a scenario in which the camera within a barcode-reading device captures an image of a defective barcode (e.g., a barcode that is damaged or printed incorrectly). In a barcode-reading system that does not include a pre-decoding filter module, the image would be passed to the barcode-decoding module, which can be configured to process the image using all of its barcode-decoding algorithms before giving up and determining that the barcode is not decodable. This can take a relatively long time. However, the use of a pre-decoding filter module can enable the overall barcode-reading system to more quickly conclude that the barcode in the image is not decodable. The image can initially be passed to the pre-decoding filter module. If the pre-decoding filter module determines that the image is likely not decodable by the barcode-decoding module, the image can be discarded without being passed to the barcode-decoding module, thereby saving all of the time that the barcode-decoding module would otherwise spend processing the image.

In some embodiments, an image can be repeatedly passed to the pre-decoding filter module until either (a) a decoding prediction is returned which indicates that the image is likely to decodable by the barcode-decoding module, or (b) the image has been processed N times by the pre-decoding filter module, where N is a positive integer that is greater than or equal to two.

In some embodiments, training of a decodability MLM can continue even after the decodability MLM has been deployed. For example, training can be applied to a copy of the decodability MLM, thereby creating an updated decodability MLM. The training can be based on new image records from the image data repository. When the barcode-reading device enters an inactive state, the decodability MLM can be replaced with the updated decodability MLM.

In some embodiments, new image records can be continually added to the image data repository in order to facilitate training of a decodability MLM. In some embodiments, whenever the barcode-decoding module processes an image, that image can be evaluated to determine whether the image should be added to the image data repository. Predefined training criteria can be utilized to evaluate the image. The image can be added to the image data repository if the image satisfies at least one training criterion.

In some embodiments, the techniques disclosed herein can be utilized in a system where a plurality of barcode-reading devices capture images and send the images to a barcode-decoding module on a remote server for decoding. In such embodiments, the remote server can also include a training engine for training the decodability MLM and a deployment engine for deploying the decodability MLM, as well as an image data repository. The image data repository can include image records comprising images captured by a plurality of different barcode-reading devices that have sent the images to the barcode-decoding module.

In some embodiments, the techniques disclosed herein can be utilized by a single barcode-reading device. In such embodiments, a barcode-decoding engine within the barcode-reading device can include a barcode-decoding module and a pre-decoding filter module comprising a decodability MLM.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
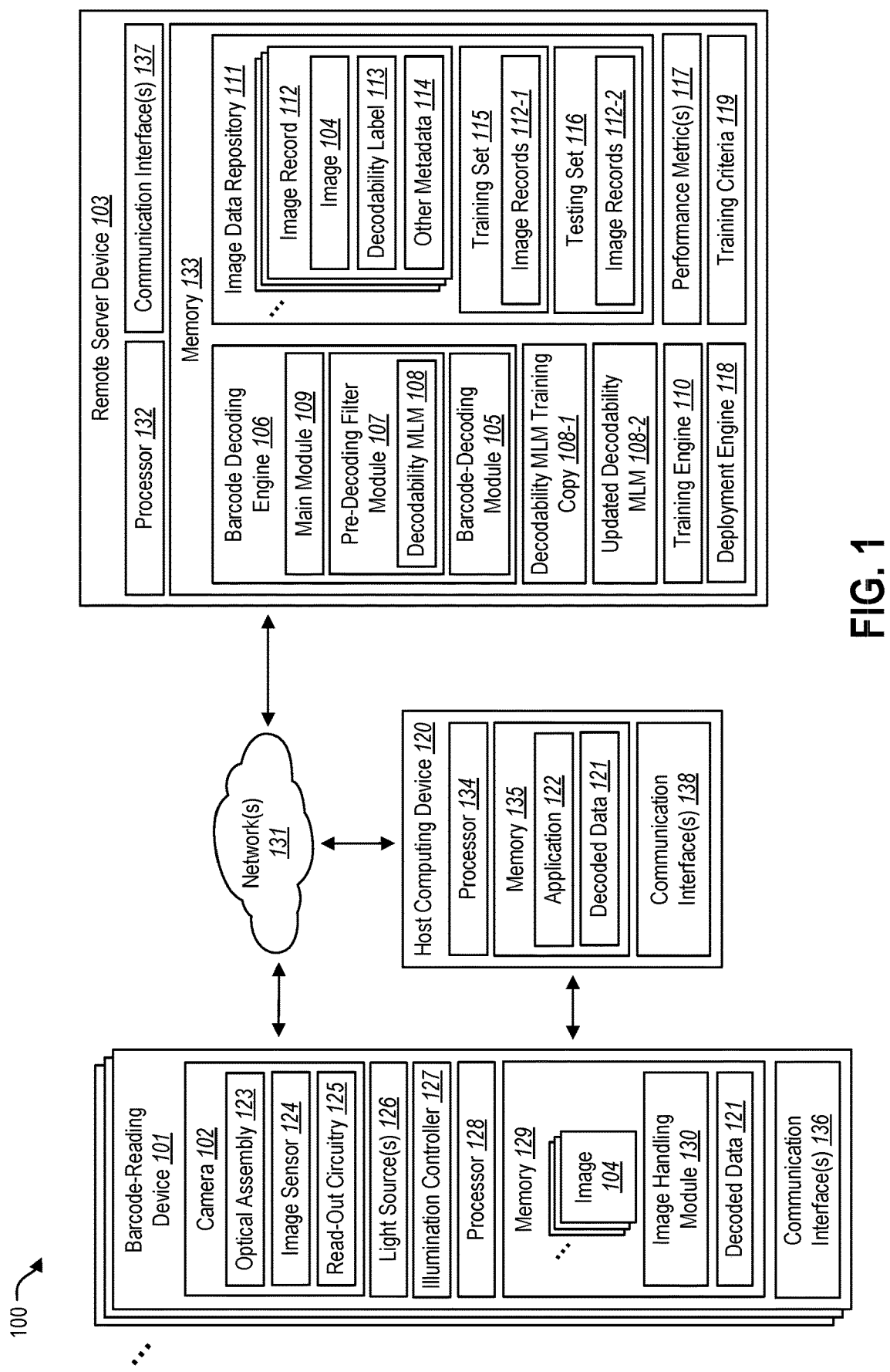
FIG. 1 illustrates an example of a system in which the techniques disclosed herein can be utilized, the system including a decodability machine learning model (MLM) implemented as part of a barcode-decoding engine.

FIG. 1 illustrates an example of a system 100 in which the techniques disclosed herein can be utilized. The system 100 includes a plurality of barcode-reading devices 101. The barcode-reading devices 101 are imaging-based barcode-reading devices. Each barcode-reading device 101 includes a camera 102.

In the depicted system 100, decoding occurs on a remote server device 103. In other words, instead of a local decoder on a barcode-reading device 101 attempting to decode barcodes in images 104 captured by the camera 102, the barcode-reading device 101 sends the images 104 to a remote server device 103 for decoding.

A barcode-reading system in which decoding is performed by a remote server is described in U.S. patent application Ser. No. 17/731,546 ("the '546 application"), titled "Barcode-Reading System in Which Decoding Occurs on a Remote Server," which is assigned to the assignee of the present application. The contents of the '546 application are hereby incorporated by reference in their entirety.

The barcode-reading device 101 includes an image handling module 130 that is configured to send images 104 captured by the camera 102 to the remote server device 103 for decoding. The remote server device 103 includes a barcode-decoding module 105. The barcode-decoding module 105 is configured to implement one or more barcode-decoding algorithms. Implementing the barcode-decoding algorithm(s) involves attempting to find and decode barcodes in the images 104 received from barcode-reading devices 101.

The barcode-decoding module 105 is part of a barcode-decoding engine 106 that runs on the remote server device 103. The barcode-decoding engine 106 also includes a pre-decoding filter module 107, which includes a decodability MLM 108. The barcode-decoding engine 106 also includes a main module 109 that generally controls the operation of the barcode-decoding engine 106.

There are many different types of machine learning models that could be utilized to implement the decodability MLM 108. Some non-limiting examples of machine learning models that could be utilized to implement the decodability MLM 108 include neural networks (including convolutional neural networks and/or recurrent neural networks), support vector machines, random forests, deep belief networks, transfer learning models, and so forth. Of course, the specific examples just listed should not be interpreted as limiting the scope of the present disclosure. Those skilled in the art will recognize that other types of machine learning models can be utilized to implement the decodability MLM 108.

The decodability MLM 108 is trained to predict decodability of an image 104 by the barcode-decoding module 105. The decodability MLM 108 can be used to filter out images 104 that are not likely to be decodable before those images 104 are passed to the barcode-decoding module 105. Advantageously, the decodability MLM 108 is not merely trained to predict decodability of an image 104 by a generic barcode-decoding module. Rather, the decodability MLM 108 is trained to predict decodability of an image 104 by the specific barcode-decoding module 105 that will process the image 104. This can improve the accuracy of the decodability MLM 108.

The remote server device 103 also includes a training engine 110. The training engine 110 is configured to train the decodability MLM 108. The training of the decodability MLM 108 can utilize data contained in an image data repository 111.

The image data repository 111 includes a plurality of image records 112. The image records 112 are based on images 104 processed by the barcode-decoding module 105. Each image record 112 includes an image 104 that has been received from a barcode-reading device 101 and processed by the barcode-decoding module 105. Each image record 112 also includes a decodability label 113. The decodability label 113 corresponding to a particular image 104 indicates whether the barcode-decoding module 105 was able to find and successfully decode a barcode in that image 104. An image record 112 corresponding to a particular image 104 may also include other metadata 114 about the image 104.

The image records 112 in the image data repository 111 can be separated into a training set 115 and a testing set 116. The decodability MLM 108 can initially be trained using the image records 112-1 in the training set 115. Once the decodability MLM 108 has received a sufficient amount of training, the decodability MLM 108 can be tested using the image records 112-2 in the testing set 116. Once the performance of the decodability MLM 108 compares favorably to one or more defined performance metrics 117, a deployment engine 118 can deploy the decodability MLM 108 in the pre-decoding filter module 107 within the barcode-decoding engine 106.

Image records 112 can be added to the image data repository 111 even after the decodability MLM 108 has been deployed. In some embodiments, whenever the barcode-decoding module 105 processes an image 104, a decision can be made about whether the image 104 should be added to the image data repository 111. This decision can be based on defined training criteria 119.

Even after the decodability MLM 108 has been deployed in the barcode-decoding engine 106, additional training of the decodability MLM 108 can still be performed. In some embodiments, the additional training can be performed with respect to a decodability MLM training copy 108-1. The decodability MLM training copy 108-1 is initially created by making a copy of the decodability MLM 108. Then while the decodability MLM 108 is in use as part of the barcode-decoding engine 106, additional training can be performed with respect to the decodability MLM training copy 108-1. This additional training can result in the creation of an updated decodability MLM 108-2. The updated decodability MLM 108-2 can replace the decodability MLM 108 in the pre-decoding filter module 107 at some point in time when the decodability MLM 108 is not in use, as will be described in greater detail below.

When the barcode-decoding module 105 on the remote server device 103 has processed an image 104 from a barcode-reading device 101 and successfully decoded a barcode in the image 104, the decoded data 121 can be sent back to the barcode-reading device 101. Alternatively, or in addition, the decoded data 121 can be sent to a host computing device 120 that is communicatively coupled to the barcode-reading device 101. If the decoded data 121 is sent back to the barcode-reading device 101, the barcode-reading device 101 can forward the decoded data 121 to the host computing device 120. At the host computing device 120, the decoded data 121 can be provided to an application 122 that is expecting to receive the decoded data 121.

In some embodiments, the remote server device 103 can be located in the "cloud." More specifically, the remote server device 103 can be part of a cloud computing infrastructure that is maintained and operated by a cloud computing provider for the purpose of providing cloud computing services. Examples of such cloud computing services include Amazon Web Services and Microsoft Azure.

In embodiments where the remote server device 103 is part of a cloud computing infrastructure, the remote server device 103 can be part of a private cloud or a public cloud. A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the internet.

For simplicity, a single remote server device 103 is shown in FIG. 1. In an alternative embodiment, the components that are included in the remote server device 103 can be implemented within a plurality of remote server devices, and the plurality of remote server devices can work together to implement the functionality that is described herein in connection with the remote server device 103.

The camera 102 within the barcode-reading device 101 is a digital camera, and the images 104 captured by the camera 102 are digital images. The camera 102 includes an optical assembly 123 including one or more lenses. The camera 102 also includes an image sensor 124. The image sensor 124 may alternatively be referred to as an imager, a photosensor array, etc. The image sensor 124 can be a solid-state device that is configured to detect and convey information used to make an image 104. The image sensor 124 can include a relatively large number of light-sensitive pixels that are arranged in horizontal rows and vertical columns. The image sensor 124 can be a charge-coupled display (CCD) image sensor, a complementary metal-oxide-semiconductor (CMOS) image sensor, or another type of image sensor.

The lens(es) within the optical assembly 123 can be configured to receive light reflected from objects within the field of view of the camera 102 and focus this reflected light onto the image sensor 124. The camera 102 also includes read-out circuitry 125 that is configured to electronically read the pixels within the image sensor 124 to provide an image 104 (i.e., a two-dimensional array of image data).

The barcode-reading device 101 includes one or more light sources 126 that can be activated to illuminate a barcode. The barcode-reading device 101 also includes an illumination controller 127 that controls the activation and deactivation of the light source(s) 126.

At least some of the functionality described herein in relation to the barcode-reading device 101, the remote server device 103, and the host computing device 120 can be implemented via execution of instructions stored in memory by one or more processors.

Each barcode-reading device 101 includes a processor 128 and memory 129 that is communicatively coupled to the processor 128. The memory 129 includes instructions (e.g., the image handling module 130) and data (e.g., images 104 captured by the camera 102). The instructions are executable by the processor 128 to implement some or all of the methods, steps, operations, actions, or other functionality that is disclosed herein in connection with a barcode-reading device 101. Executing the instructions can involve the use of the data that is stored in the memory 129.

Similarly, the remote server device 103 includes a processor 132 and memory 133 that is communicatively coupled to the processor 132. The memory 133 includes instructions (e.g., the barcode-decoding engine 106, the training engine 110, the deployment engine 118) and data (e.g., the image data repository 111, the performance metric(s) 117, the training criteria 119). The instructions are executable by the processor 132 to implement some or all of the methods, steps, operations, actions, or other functionality that is disclosed herein in connection with the remote server device 103. Executing the instructions can involve the use of the data that is stored in the memory 133.

The host computing device 120 also includes a processor 134 and memory 135 that is communicatively coupled to the processor 134. The memory 135 includes instructions (e.g., the application 122) and data (e.g., the decoded data 121). The instructions are executable by the processor 134 to implement some or all of the methods, steps, operations, actions, or other functionality that is disclosed herein in connection with the host computing device 120. Executing the instructions can involve the use of the data that is stored in the memory 135.

The barcode-reading devices 101, the remote server device 103, and the host computing device 120 each include one or more communication interfaces. In particular, the barcode-reading devices 101 each include communication interface(s) 136, the remote server device 103 includes communication interface(s) 137, and the host computing device 120 includes communication interface(s) 138. The communication interface(s) 136, 137, 138 facilitate communication amongst the barcode-reading devices 101, the remote server device 103, and the host computing device 120. Communication amongst the barcode-reading devices 101, the remote server device 103, and the host computing device 120 can occur via one or more computer networks 131. The computer network(s) 131 can include the internet.

In some embodiments, a barcode-reading device 101 can be directly coupled to a host computing device 120 such that the barcode-reading device 101 and the host computing device 120 can communicate directly with each other. Alternatively, or in addition, communication between a barcode-reading device 101 and a host computing device 120 can occur via one or more computer networks 131.

Figure 2:
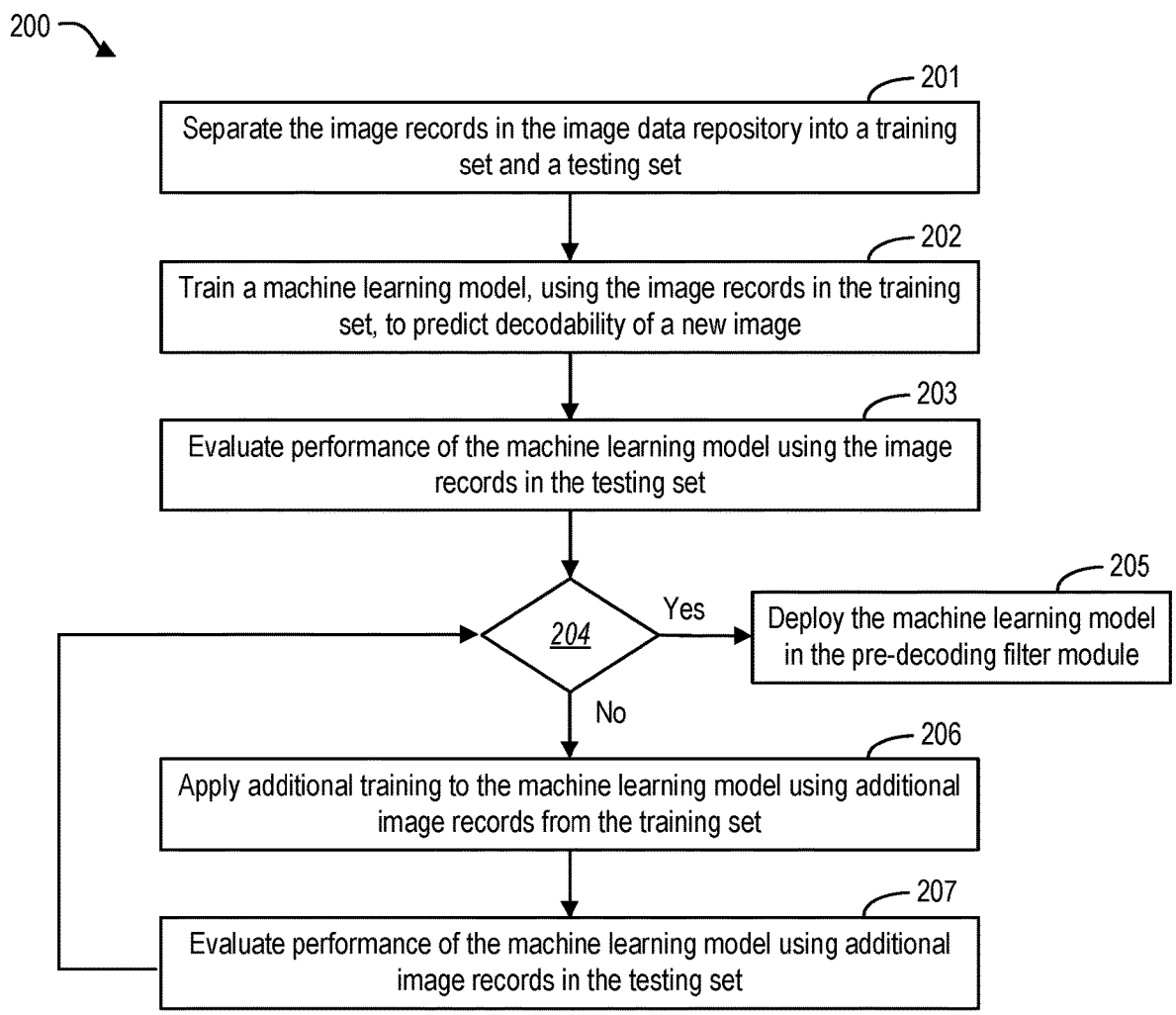
FIG. 2 illustrates an example of a method that can be implemented in order to train and deploy the decodability MLM.

FIG. 2 illustrates an example of a method 200 that can be implemented in order to train and deploy the decodability MLM 108. The method 200 can be implemented by the training engine 110 and the deployment engine 118 on the remote server device 103. The method 200 can be implemented after the barcode-decoding module 105 has processed enough images 104 that a relatively large number of image records 112 have been stored in the image data repository 111.

At 201, the training engine 110 separates the image records 112 in the image data repository 111 into a training set 115 and a testing set 116. In some embodiments, this separation can occur randomly. In other words, image records 112 can be randomly assigned to the training set 115 or the testing set 116.

At 202, the training engine 110 trains a machine learning model, using the image records 112-1 in the training set 115, to predict decodability of a new image 104 by the barcode-decoding module 105. During training, the machine learning model learns from the image records 112-1 in the training set 115 and tries to find patterns in the image records 112-1 to make accurate predictions or decisions. In some embodiments, training the machine learning model includes providing images 104 in the image records 112-1 to the machine learning model and then adjusting the machine learning model's parameters or weights iteratively based on the error or loss generated by the machine learning model's predictions compared to the actual decodability labels 113.

At 203, the training engine 110 evaluates performance of the machine learning model using the image records 112-2 in the testing set 116. During this evaluation, the machine learning model is used to make predictions on the images 104 in the testing set 116. These predictions are then compared to the actual decodability labels 113 in the testing set 116.

At 204, the training engine 110 determines whether the performance of the machine learning model compares favorably to a performance metric 117. In some embodiments, the training engine 110 can compare the accuracy of the machine learning model's predictions to a defined threshold value (e.g., a certain percentage value). In such embodiments, the defined threshold value is the performance metric 117. If the accuracy of the machine learning model's predictions exceeds this threshold value, then this can be considered to be a favorable comparison. On the other hand, if the accuracy of the machine learning model's predictions does not exceed this threshold value, then this can be considered to be an unfavorable comparison.

If at 204 the training engine 110 determines that the performance of the machine learning model compares favorably to the performance metric 117, then the method 200 proceeds to 205. At 205, the deployment engine 118 deploys the machine learning model in the pre-decoding filter module 107. As discussed above, the deployed MLM may be referred to as a decodability MLM 108.

If at 204 the training engine 110 determines that the performance of the machine learning model does not compare favorably to the performance metric 117, then the method 200 proceeds to 206. At 206, the training engine 110 applies additional training to the machine learning model using additional image records 112-1 from the training set 115.

At 207, the training engine 110 evaluates performance of the machine learning model using additional image records 112-2 in the testing set 116. The method 200 then proceeds to 204 and continues in the manner described above.

Figure 3:
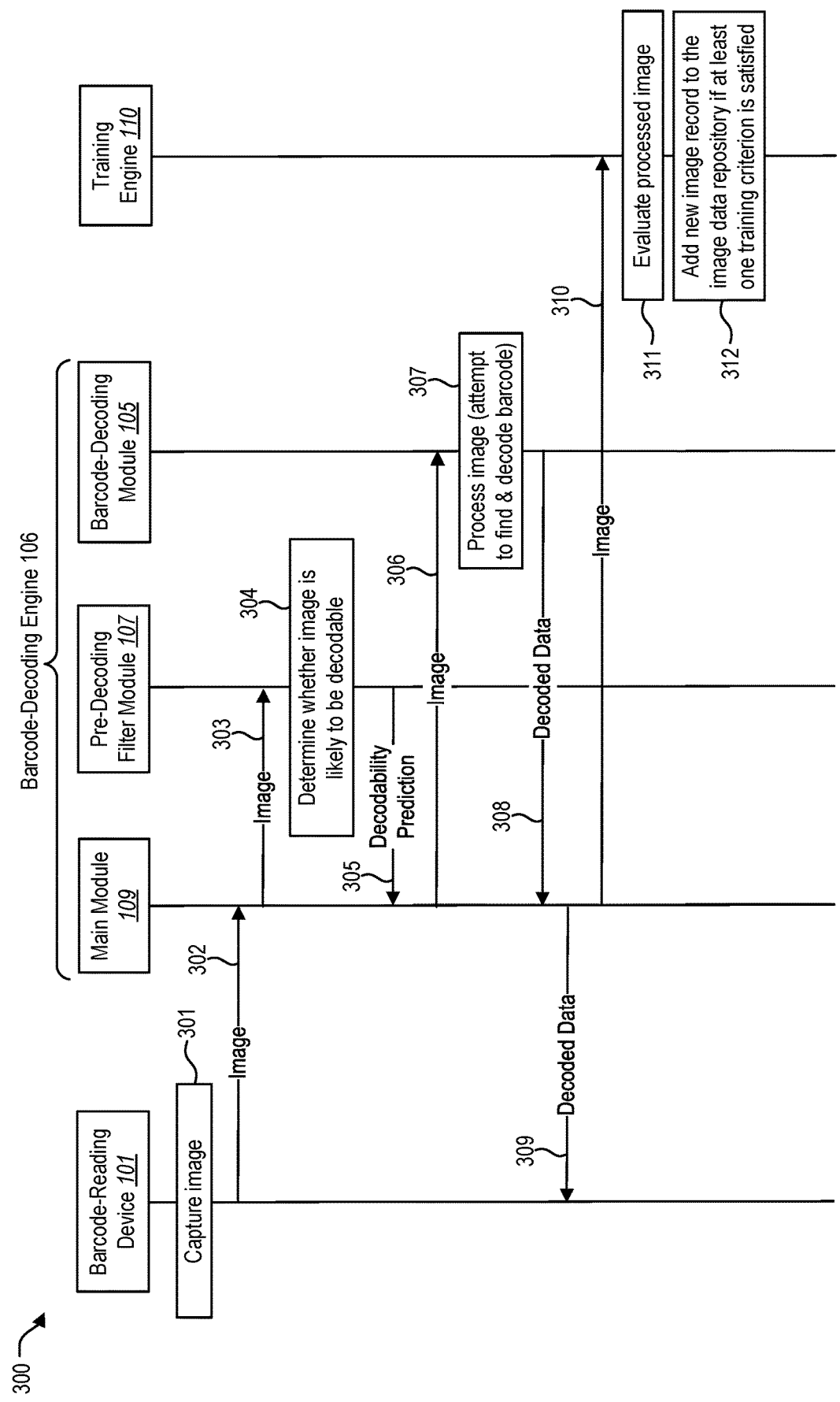
FIG. 3 illustrates an example of a method that can be implemented by various components in the system shown in FIG. 1 in order to process an image captured by a barcode-reading device.

FIG. 3 illustrates an example of a method 300 that illustrates how an image 104 can be processed by the barcode-decoding engine 106. The method 300 involves various components in the system 100 shown in FIG. 1, including the barcode-reading device 101, the barcode-decoding engine 106, and the training engine 110.

At 301, the camera 102 within the barcode-reading device 101 captures an image 104. In some embodiments, the camera 102 can capture a plurality of images 104. For example, the camera 102 can continuously capture images 104 as long as a trigger is activated. All (or many) of the images 104 captured by the camera 102 can be sent to the barcode-decoding engine 106 on the remote server device 103. For simplicity, the method 300 shown in FIG. 3 will describe how a single image 104 can be processed. Each image 104 that is sent to the barcode-decoding engine 106 can be processed in a similar manner.

At 302, the image handling module 130 within the barcode-reading device 101 sends the image 104 to the barcode-decoding engine 106. The image 104 can be sent to the barcode-decoding engine 106 via the communication interface(s) 136 of the barcode-reading device 101. The image 104 can be received by the remote server device 103 via the communication interface(s) 137 of the remote server device 103. When the image 104 is received at the remote server device 103, the image 104 can be delivered to the main module 109 of the barcode-decoding engine 106.

At 303, the main module 109 of the barcode-decoding engine 106 provides the image 104 to the pre-decoding filter module 107. This occurs before the image 104 is provided to the barcode-decoding module 105.

At 304, the pre-decoding filter module 107 determines whether the image 104 is likely to be decodable by the barcode-decoding module 105. In particular, the decodability MLM 108 within the pre-decoding filter module 107 processes the image 104 and returns a decodability prediction. In some embodiments, the decodability prediction has two possible values: a first value indicating that the image 104 is likely to be decodable by the barcode-decoding module 105, and a second value indicating that the image 104 is not likely to be decodable by the barcode-decoding module 105. In alternative embodiments, the decodability prediction can have more than two possible values.

At 305, the pre-decoding filter module 107 returns the decodability prediction to the main module 109. For purposes of the present example, it will be assumed that the decodability prediction indicates that the image 104 is likely to be decodable by the barcode-decoding module 105.

At 306, in response to receiving the decodability prediction from the pre-decoding filter module 107, the main module 109 provides the image 104 to the barcode-decoding module 105.

At 307, the barcode-decoding module 105 processes the image 104. More specifically, the barcode-decoding module 105 attempts to find a barcode within the image 104. If the barcode-decoding module 105 finds a barcode within the image 104, then the barcode-decoding module 105 attempts to decode the barcode. For purposes of the present example, it will be assumed that the barcode-decoding module 105 is able to successfully decode a barcode within the image 104, thereby generating decoded data 121. At 308, the barcode-decoding module 105 returns the decoded data 121 to the main module 109.

At 309, the main module 109 of the barcode-decoding engine 106 causes the decoded data 121 to be sent back to the barcode-reading device 101. As noted above, the barcode-reading device 101 can forward the decoded data 121 to the host computing device 120. Alternatively, or in addition, the main module 109 of the barcode-decoding engine 106 could cause the decoded data 121 to be sent directly to the host computing device 120.

At 310, the main module 109 of the barcode-decoding engine 106 provides the image 104 to the training engine 110. At 311, the training engine 110 evaluates the image 104 to determine whether the image 104 should be added to the image data repository 111 where it can be used for future training. In some embodiments, the training engine 110 evaluates the image 104 to determine whether any of the pre-defined training criteria 119 have been satisfied. If a determination is made that the image 104 should be added to the image data repository 111 (e.g., at least one of the pre-defined training criteria 119 have been satisfied), then the method 300 proceeds to 312. However, if a determination is made that the image 104 should not be added to the image data repository 111, then the method 300 ends without proceeding to 312.

At 312, the training engine 110 adds the image 104 to the image data repository 111. More specifically, the training engine 110 causes a new image record 112 to be created in the image data repository 111. As noted above, the new image record 112 includes the image 104, a decodability label 113 indicating whether the image 104 was successfully decoded by the barcode-decoding module 105, and potentially other metadata 114 as well.

In the example shown in FIG. 3, an image 104 is added to the image data repository 111 only if the image 104 satisfies one or more of the pre-defined training criteria 119. One benefit of this approach is that it limits the number of images 104 that are added to the image data repository 111. In a barcode-reading system 100 where a large number of images 104 are being captured and processed by the barcode-decoding engine 106, having pre-defined training criteria 119 can prevent the image data repository 111 from becoming overloaded with images 104. However, the use of pre-defined training criteria 119 is not required. In an alternative embodiment, each image 104 that is processed by the barcode-decoding module 105 could be added to the image data repository 111.

There are many different types of pre-defined training criteria 119 that could be utilized. In some embodiments, the barcode-decoding module 105 can be configured to provide image processing data about the images 104 that it processes, and the pre-defined training criteria 119 can be based on the image processing data provided by the barcode-decoding module 105. For example, after the barcode-decoding module 105 has processed an image 104, the barcode-decoding module 105 can provide image processing data related to the image 104 that indicates (i) whether the barcode-decoding module 105 was able to find a barcode in the image 104, and (ii) whether the barcode-decoding module 105 was able to successfully decode the barcode. In such embodiments, the pre-defined training criteria 119 can include a rule which states that an image 104 should be added to the image data repository 111 if the barcode-decoding module 105 was able to find a barcode in the image 104 but was not able to successfully decode the barcode.

As another example, the image processing data provided by the barcode-decoding module 105 can include a time-to-decode metric. The time-to-decode metric corresponding to a particular image 104 can indicate how long it took the barcode-decoding module 105 to decode the image 104. As a general rule, the quality of an image 104 is inversely proportional to the length of time required to decode the image 104 (e.g., poor quality images generally take longer to decode). In embodiments where the image processing data includes a time-to-decode metric, the pre-defined training criteria 119 can include a rule which states that an image 104 should be added to the image data repository 111 if the value of the time-to-decode metric exceeds a pre-defined threshold value. This type of rule would facilitate the training of a decodability MLM 108 to recognize images 104 that take a long time to decode.

As another example, the image processing data provided by the barcode-decoding module 105 can include a median pixel brightness metric. The median pixel brightness metric corresponding to a particular image 104 can indicate how light or dark the image 104 is. If an image 104 is too dark or too light, it is unlikely that the image 104 will be decodable. In embodiments where the image processing data includes a median pixel brightness metric, the pre-defined training criteria 119 can include a rule which states that an image 104 should be added to the image data repository 111 if the value of the median pixel brightness metric is above a defined upper threshold value or below a defined lower threshold value. This type of rule would facilitate the training of a decodability MLM 108 to recognize images 104 that are too dark or too light.

As another example, the image processing data provided by the barcode-decoding module 105 can include symbology information. The symbology information corresponding to a particular image 104 containing a barcode can indicate the symbology of the barcode. Having symbology information in the image processing data can be beneficial because some symbologies are more difficult to read and decode than others. In embodiments where the image processing data includes symbology information, the pre-defined training criteria 119 can include a rule which states that an image 104 should be added to the image data repository 111 if the image 104 includes a barcode having a symbology that belongs to a pre-defined set of symbologies. This type of rule would facilitate the training of a decodability MLM 108 to recognize images 104 having barcodes with certain specific symbologies.

As another example, the image processing data provided by the barcode-decoding module 105 can include a decodability metric. The decodability metric corresponding to a particular image 104 can indicate how decodable the image 104 is. In embodiments where the image processing data includes a decodability metric, the pre-defined training criteria 119 can include a rule which states that an image 104 should be added to the image data repository 111 based on an unfavorable comparison of the decodability metric to a pre-defined threshold value (e.g., the decodability metric is below a defined threshold value that indicates a minimum level of decodability). This type of rule would facilitate the training of a decodability MLM 108 to recognize images 104 that are unlikely to be decodable.

The decodability metric in the previous example could be based on a plurality of factors. Some examples include a contrast score (e.g., an indication of whether there are clear light-to-dark transitions in an image 104, which makes decoding easier), a modulation metric (e.g., an indication of how even the dark and light patterns in the barcode are), a reflectance margin (e.g., an indication of whether the barcode in an image 104 is sufficiently distinguishable from the background), a fixed pattern damage metric (e.g., an indication of whether the known patterns in a barcode are damaged), an axial non-uniformity metric (e.g., an indication of whether a barcode is "stretched" in a specific direction), a grid non-uniformity metric (e.g., an indication of how much a barcode deviates from an ideal grid), an unused error correction metric (e.g., an indication of how much error correction occurred), a print growth metric (e.g., an indication of how much bleeding occurred while printing the barcode), and so forth.

Instead of having a rule that is based on an overall decodability metric, the pre-defined training criteria 119 could include one or more rules that are based on any of the individual factors on which the overall decodability metric is based.

Of course, the foregoing are just a few possible examples of the training criteria 119 that could be utilized, and these examples should not be interpreted as limiting the scope of the present disclosure. Those skilled in the art will recognize other examples of training criteria 119 that could be utilized.

Figure 4:
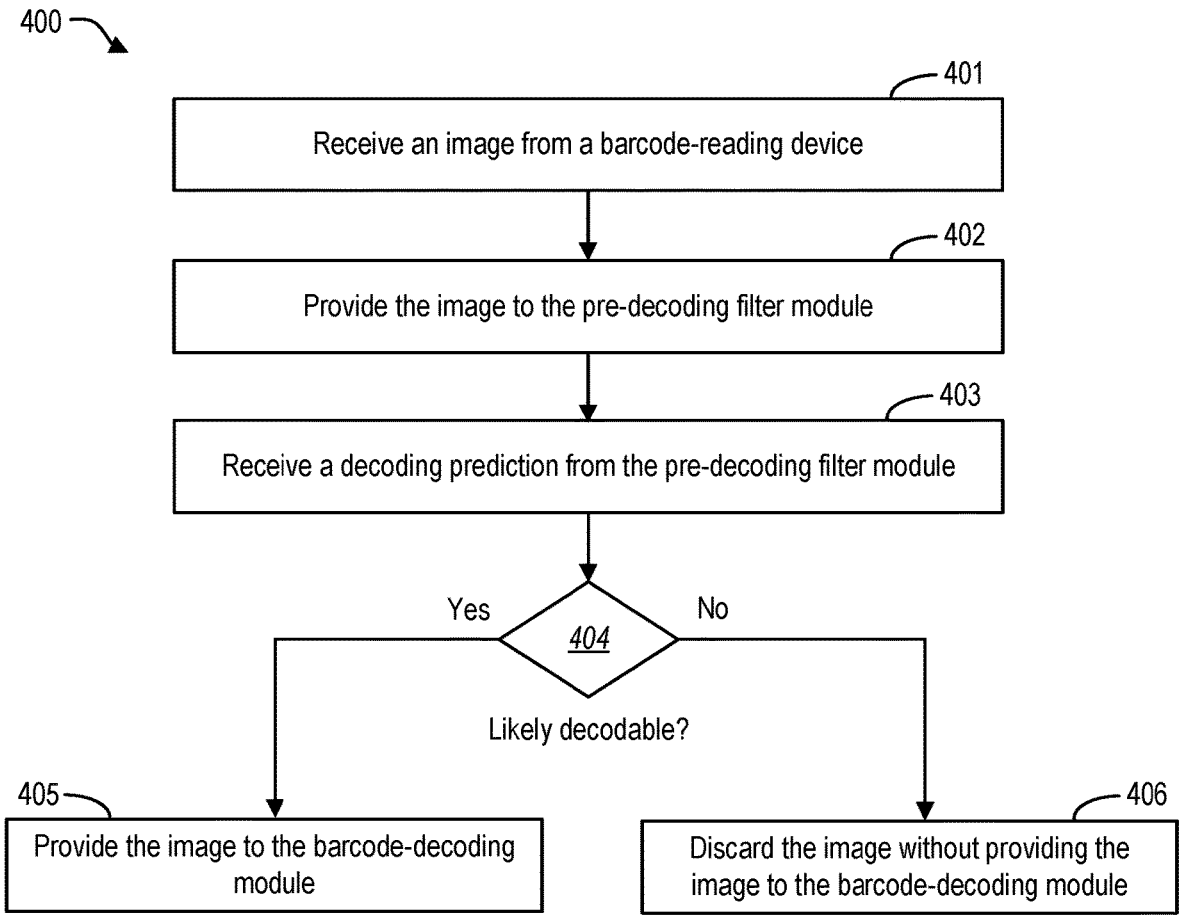
FIG. 4 illustrates an example of a method that can be implemented by the barcode-decoding engine in the system shown in FIG. 1 in order to process an image captured by a barcode-reading device.

FIG. 4 illustrates another example of a method 400 that illustrates how an image 104 can be processed by the barcode-decoding engine 106. The method 400 shown in FIG. 4 illustrates the actions that can be performed by the main module 109 of the barcode-decoding engine 106.

At 401, the main module 109 of the barcode-decoding engine 106 receives an image 104 from a barcode-reading device 101. At 402, the main module 109 of the barcode-decoding engine 106 provides the image 104 to the pre-decoding filter module 107 before providing the image 104 to the barcode-decoding module 105.

At 403, the main module 109 of the barcode-decoding engine 106 receives a decoding prediction from the pre-decoding filter module 107. At 404, the main module 109 of the barcode-decoding engine 106 evaluates the decoding prediction to determine whether the image 104 is likely to be decodable by the barcode-decoding module 105.

If at 404 it is determined that the decoding prediction indicates that the image 104 is likely to be decodable by the barcode-decoding module 105, then the method 400 proceeds to 405. At 405, the main module 109 of the barcode-decoding engine 106 provides the image 104 to the barcode-decoding module 105.

If at 404 it is determined that the decoding prediction indicates that the image 104 is not likely to be decodable by the barcode-decoding module 105, then the method 400 proceeds to 406. At 406, the main module 109 of the barcode-decoding engine 106 discards the image 104 without providing the image 104 to the barcode-decoding module 105.

The method 400 shown in FIG. 4 illustrates some of the benefits and advantages of including a pre-decoding filter module 107 (with a decodability MLM 108) in the barcode-decoding engine 106. For example, suppose that the image 104 received at 401 is an image 104 of a defective barcode (e.g., a barcode that is damaged or printed incorrectly). If the barcode-decoding engine 106 did not include the pre-decoding filter module 107, the image 104 would be passed to the barcode-decoding module 105. The barcode-decoding module 105 would most likely process the image 104 using all of its barcode-decoding algorithms before giving up and determining that the barcode is not decodable. This would take a relatively long time. However, the use of the pre-decoding filter module 107 can enable the barcode-decoding engine 106 to more quickly conclude that the barcode in the image 104 is not decodable. In particular, the decodability MLM 108 within the pre-decoding filter module 107 can quickly determine that the image 104 is not decodable before the image 104 is ever passed to the barcode-decoding module 105. The image 104 can therefore be discarded without being passed to the barcode-decoding module 105, thereby saving all of the time that the barcode-decoding module 105 would otherwise spend processing the image 104.

Figure 5:
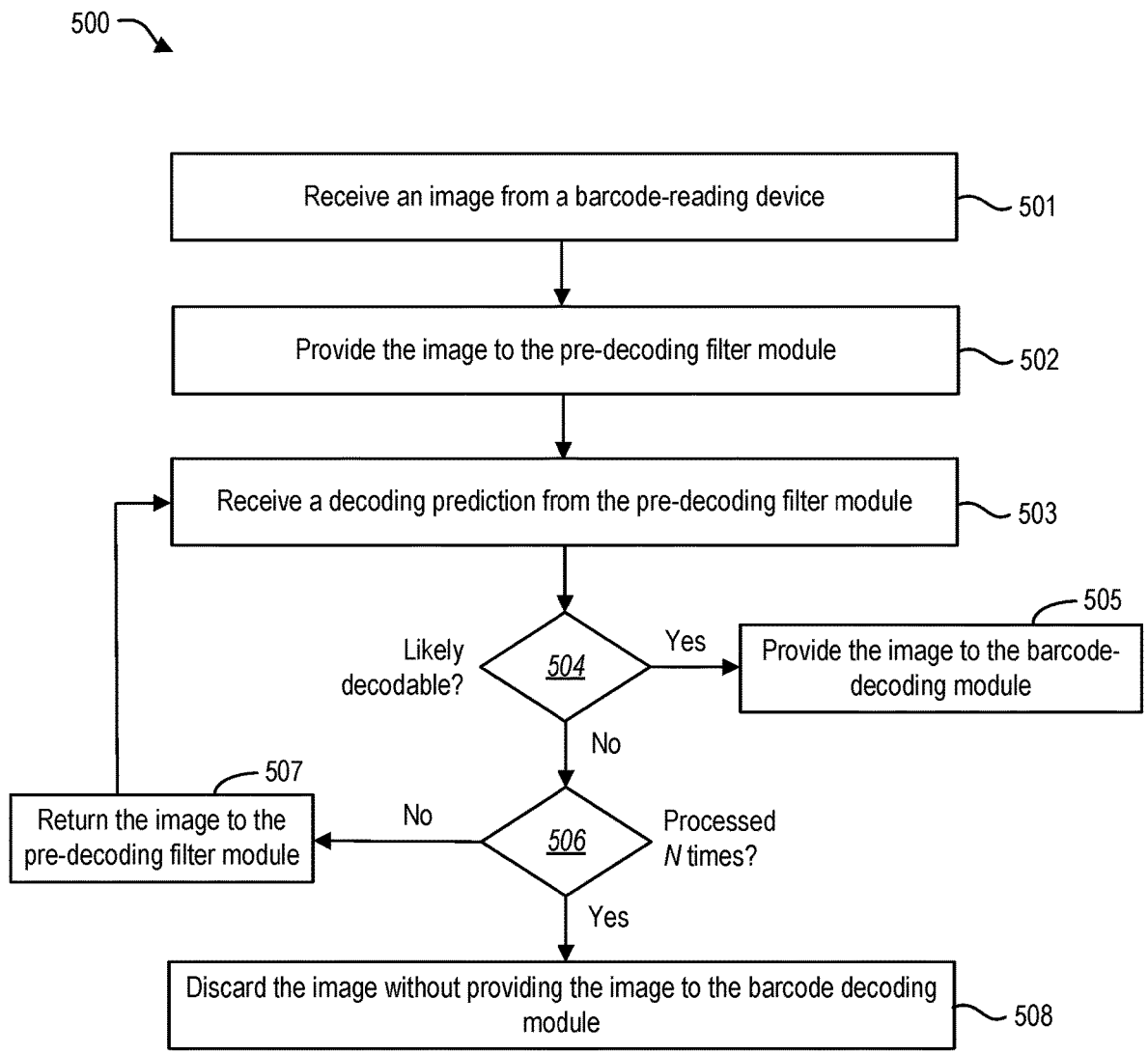
FIG. 5 illustrates another example of a method that can be implemented by the barcode-decoding engine in the system shown in FIG. 1 in order to process an image captured by a barcode-reading device.

In some embodiments, the main module 109 of the barcode-decoding engine 106 can be configured to repeatedly provide an image 104 to the pre-decoding filter module 107 until either (i) the decoding prediction returned from the pre-decoding filter module 107 indicates that the image 104 is likely to be decodable by the barcode-decoding module 105, or (ii) the image 104 has been processed N times by the pre-decoding filter module 107, where N is a positive integer greater than or equal to two. FIG. 5 illustrates an example of a method 500 where the main module 109 of the barcode-decoding engine 106 is configured in this manner.

At 501, the main module 109 of the barcode-decoding engine 106 receives an image 104 from a barcode-reading device 101. At 502, the main module 109 of the barcode-decoding engine 106 provides the image 104 to the pre-decoding filter module 107 before providing the image 104 to the barcode-decoding module 105.

At 503, the main module 109 of the barcode-decoding engine 106 receives a decoding prediction from the pre-decoding filter module 107. At 504, the main module 109 of the barcode-decoding engine 106 evaluates the decoding prediction to determine whether the image 104 is likely to be decodable by the barcode-decoding module 105.

If at 504 it is determined that the decoding prediction indicates that the image 104 is likely to be decodable by the barcode-decoding module 105, then the method 500 proceeds to 505. At 505, the main module 109 of the barcode-decoding engine 106 provides the image 104 to the barcode-decoding module 105.

If at 504 it is determined that the decoding prediction indicates that the image 104 is not likely to be decodable by the barcode-decoding module 105, then the method 500 proceeds to 506. At 506, a determination is made about whether the image 104 has been processed N times by the pre-decoding filter module 107, where N is an integer that is greater than or equal to two.

If at 506 it is determined that the image 104 has not yet been processed N times by the pre-decoding filter module 107, then the method 500 proceeds to 507. At 507, the main module 109 of the barcode-decoding engine 106 returns the image 104 to the pre-decoding filter module 107 to be processed again. The method 500 then returns to 503 and proceeds as described above.

If at 506 it is determined that the image 104 has been processed N times by the pre-decoding filter module 107, then the method 500 proceeds to 508. At 508, the main module 109 of the barcode-decoding engine 106 discards the image 104 without providing the image 104 to the barcode-decoding module 105. Thus, in the depicted method 500, the image 104 is discarded when the image 104 has been processed N times by the pre-decoding filter module 107 and each decoding prediction generated by the pre-decoding filter module 107 indicates that the captured image 104 is not likely to be decodable by the barcode-decoding module 105.

Figure 6:
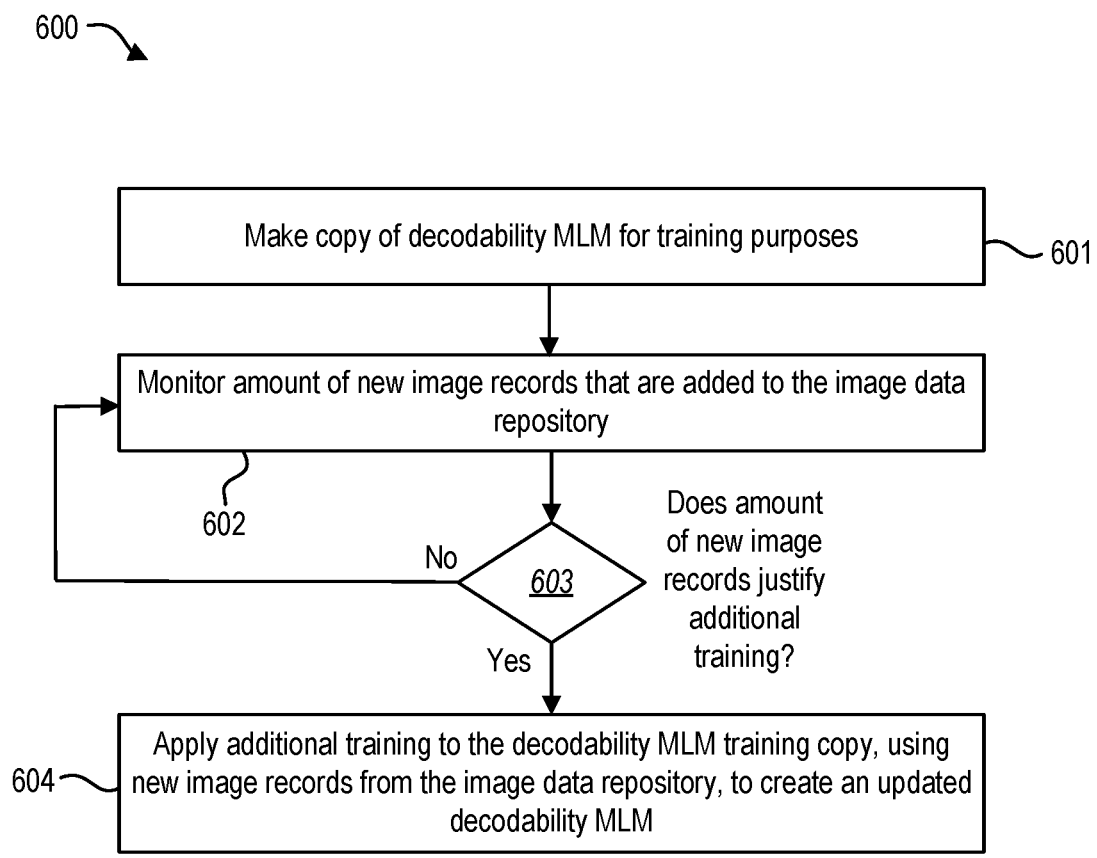
FIG. 6 illustrates an example of a method for performing additional training with respect to a copy of a decodability MLM after the decodability MLM has been deployed.

As noted above, even after a decodability MLM 108 has been deployed, additional training may be performed with respect to the decodability MLM 108. FIG. 6 illustrates a method 600 showing an example of how this can occur. The method 600 can be implemented by the training engine 110 in the barcode-decoding engine 106.

At 601, the training engine 110 makes a copy of the decodability MLM 108. As noted above, this copy may be referred to herein as the decodability MLM training copy 108-1.

In the depicted example, the training of the decodability MLM training copy 108-1 occurs when a sufficient number of new image records 112 have been added to the image data repository 111 after the decodability MLM 108 is deployed. Thus, at 602, the training engine 110 monitors the amount of new image records 112 that are added to the image data repository 111.

At 603, a determination is made about whether the number of new image records 112 (i.e., the number of image records 112 that have been added to the image data repository 111 since the decodability MLM 108 was deployed) is sufficient to justify additional training being performed on the decodability MLM training copy 108-1. In some embodiments, additional training is justified if the number of new image records 112 exceeds a defined threshold value.

If at 603 it is determined that the number of new image records 112 is not sufficient to justify additional training, then the method 600 returns to 602 and proceeds as described above.

On the other hand, if at 603 it is determined that the number of new image records 112 is sufficient to justify additional training, then the method 600 proceeds to 604. At 604, the training engine 110 applies additional training to the decodability MLM training copy 108-1, using new image records 112 from the image data repository 111, to create an updated decodability MLM 108-2.

Figure 7:
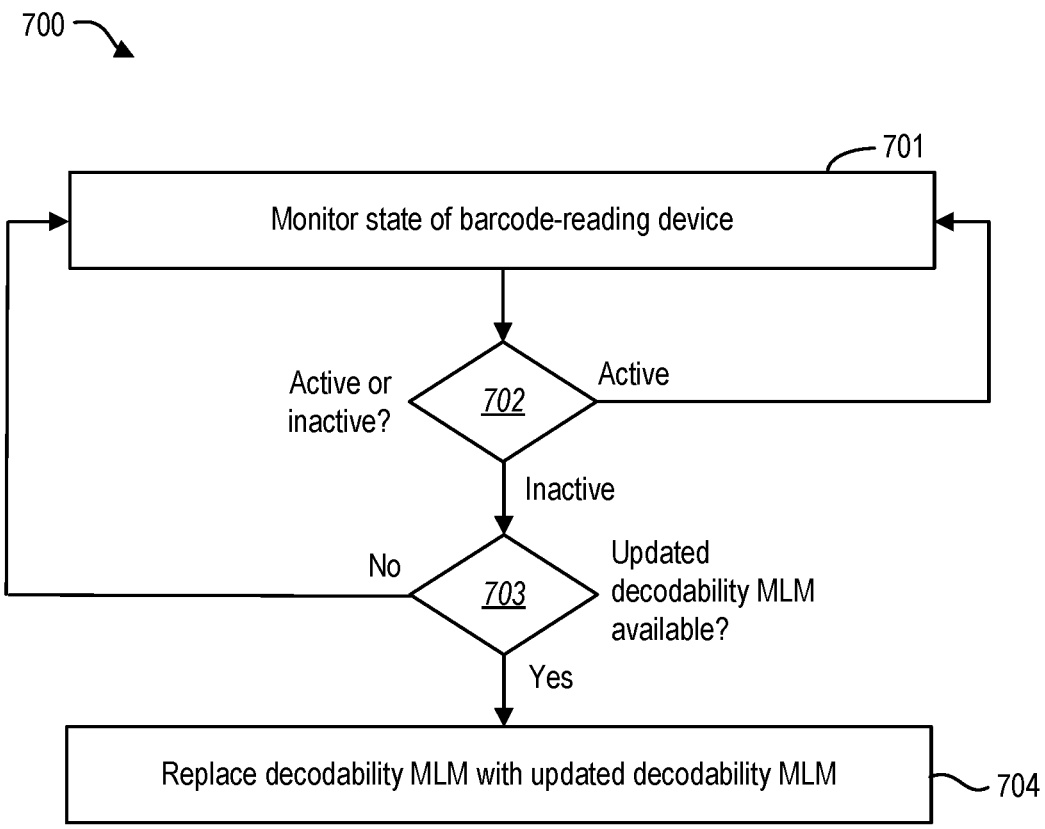
FIG. 7 illustrates an example of a method for replacing a decodability MLM with an updated decodability MLM.

The updated decodability MLM 108-2 can replace the decodability MLM 108 in the pre-decoding filter module 107 at some point in time when the decodability MLM 108 is not in use. FIG. 7 illustrates a method 700 showing an example of how this can occur. The method 700 can be implemented by the deployment engine 118.

At 701, the deployment engine 118 can monitor the state of the barcode-reading device 101. In some embodiments, the barcode-reading device 101 can be capable of operating in at least two different states: an active state in which the barcode-reading device 101 is actively being used to read barcodes, and an inactive state in which the barcode-reading device 101 is not actively being used to read barcodes. At 702, a determination is made about whether the barcode-reading device 101 is operating in the active state or the inactive state.

If at 702 it is determined that the barcode-reading device 101 is operating in the active state, the method 700 returns to 701 and proceeds as described above.

If at 702 it is determined that the barcode-reading device 101 is operating in the inactive state, the method 700 proceeds to 703. At 703, a determination is made about whether an updated decodability MLM 108-2 is available.

If at 703 it is determined that an updated decodability MLM 108-2 is not available, the method 700 returns to 701 and proceeds as described above.

On the other hand, if at 703 it is determined that an updated decodability MLM 108-2 is available, the method 700 proceeds to 704. At 704, the deployment engine 118 replaces the decodability MLM 108 that was previously deployed with the updated decodability MLM 108-2.

In the system 100 described up to this point, decoding occurs on a remote server device 103 (or a combination of a plurality of remote server devices working together), and so the pre-decoding filter module 107 is deployed in a location that is remote from the barcode-reading device 101. In an alternative embodiment, the techniques disclosed herein can be implemented in a barcode-reading device in which decoding occurs on the barcode-reading device itself. In such embodiments, the pre-decoding filter module can be deployed on the barcode-reading device itself.

Figure 8:
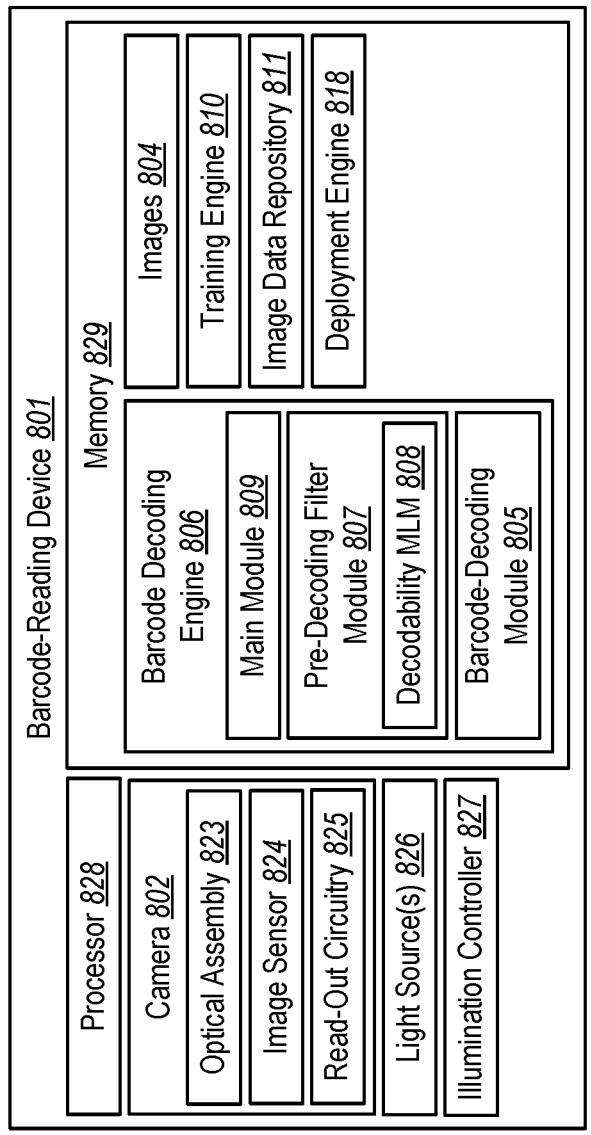
FIG. 8 illustrates an example of a barcode-reading device in which decoding occurs locally on the barcode-reading device and a pre-decoding filter module is also implemented locally on the barcode-reading device.

FIG. 8 illustrates an example of a barcode-reading device 801 in which decoding occurs locally on the barcode-reading device 801 and a pre-decoding filter module 807 is also implemented locally on the barcode-reading device 801.

The camera 802 (including the optical assembly 823, image sensor 824, and read-out circuitry 825), light source(s) 826, illumination controller 827, processor 828, and memory 829 are similar to the corresponding components in the barcode-reading device 101 described previously. The camera 802 is configured to capture images 804, which are shown as being stored in the memory 829.

In the depicted embodiment, however, the barcode-decoding engine 806 is implemented on the barcode-reading device 801 itself, rather than on a remote server device (as in the system 100 described previously).

The barcode-decoding engine 806 is otherwise similar to the barcode-decoding engine 106 described previously. The pre-decoding filter module 807 includes a decodability MLM 808. In addition to the pre-decoding filter module 807, the barcode-decoding engine 806 also includes a main module 809 and a barcode-decoding module 805. These components can be configured to operate similarly to the corresponding components in the barcode-decoding engine 106 described previously.

The barcode-reading device 801 also includes a training engine 810, an image data repository 811, and a deployment engine 818. These components can also be configured to operate similarly to the corresponding components in the barcode-reading device 101 described previously.

In the context of barcodes, the term "symbology" refers to a defined method of representing data using lines, spaces, shapes, and/or patterns. Broadly speaking, barcode symbologies are divided into two main types: one-dimensional (1D) barcode symbologies and two-dimensional (2D) barcode symbologies. 1D barcode symbologies represent data by varying the widths, spacings, and sizes of parallel lines. Some non-limiting examples of 1D barcode symbologies include UPC (Universal Product Code) and Code 128. 2D barcode symbologies use various shapes (e.g., rectangles, dots, hexagons) arranged in specific patterns to represent data. Some non-limiting examples of 2D barcode symbologies include QR (Quick Response) Code, Data Matrix, Maxicode, and Aztec.

As used herein, the term "1D barcode" refers to a barcode that has been encoded in accordance with a 1D barcode symbology. The term "2D barcode" refers to a barcode that has been encoded in accordance with a 2D barcode symbology. The term "barcode" may refer to either a 1D barcode or a 2D barcode.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random-access memory (RAM), read-only memory (ROM), non-volatile random-access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

Any communication interface(s) described herein can be based on wireless communication technology and/or wired communication technology. Some examples of communication interfaces that are based on wireless communication technology include a Bluetooth wireless communication adapter, a wireless adapter that operates in accordance with an Institute of Electrical and Electronics Engineers (IEEE) 802.11 wireless communication protocol, and an infrared (IR) communication port. Some examples of communication interfaces that are based on wired communication technology include a Universal Serial Bus (USB) and an Ethernet adapter.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system, comprising:
    a barcode-decoding engine running on at least one remote server device comprising at least one remote server processor, the barcode-decoding engine comprising a barcode-decoding module and a pre-decoding filter module, the pre-decoding filter module comprising a decodability machine learning model (MLM) that is trained to predict decodability of an image by the barcode-decoding module;
    a barcode-reading device, comprising:
        a camera that is configured to capture images;
        a communication interface that is configured to communicatively couple the barcode-reading device to the at least one remote server device via one or more computer networks; and
        an image handling module that is executable by a barcode-reading device processor to cause the images to be sent to the barcode-decoding engine via the communication interface;
    wherein the barcode-decoding engine is executable by the at least one remote server processor to receive a captured image from the barcode-reading device, provide the captured image to the pre-decoding filter module, receive a decoding prediction for the captured image from the pre-decoding filter module, and provide the captured image to the barcode-decoding module only if the decoding prediction indicates that the captured image is likely to be decodable by the barcode-decoding module.

2. The barcode-reading system of claim 1, wherein the barcode-decoding engine is additionally executable by the at least one remote server processor to discard the captured image without sending the captured image to the barcode-decoding module if the decoding prediction indicates that the captured image is not likely to be decodable by the barcode-decoding module.

3. The barcode-reading system of claim 1, wherein the barcode-decoding engine is additionally executable by the at least one remote server processor to repeatedly provide the captured image to the pre-decoding filter module until:
    the decoding prediction indicates that the captured image is likely to be decodable by the barcode-decoding module; or the captured image has been processed N times by the pre-decoding filter module, wherein N is a positive integer greater than or equal to two.

4. The barcode-reading system of claim 3, wherein the barcode-decoding engine is additionally executable by the at least one remote server processor to discard the captured image without sending the captured image to the barcode-decoding module if the captured image has been processed N times by the pre-decoding filter module and each decoding prediction generated by the pre-decoding filter module indicates that the captured image is not likely to be decodable by the barcode-decoding module.

5. The barcode-reading system of claim 1, further comprising:
an image data repository comprising a plurality of image records based on images processed by the barcode-decoding module; and
a training engine that is executable by the at least one remote server processor to train the decodability MLM using the plurality of image records.

6. The barcode-reading system of claim 5, wherein each image record among the plurality of image records comprises:
an image processed by the barcode-decoding module; and
a decodability label indicating whether the barcode-decoding module was able to find a barcode in the image and successfully decode the barcode.

7. The barcode-reading system of claim 5, wherein the training engine is additionally executable by the at least one remote server processor to:
evaluate a processed image that has been processed by the barcode-decoding module; and
add a new image record comprising the processed image to the image data repository if the processed image satisfies at least one training criterion.

8. The barcode-reading system of claim 7, wherein:
the barcode-decoding module is configured to provide image processing data about processed images; and
the at least one training criterion is based on the image processing data.

9. The barcode-reading system of claim 5, wherein the training engine is additionally executable by the at least one remote server processor to apply additional training to a copy of the decodability MLM, using new image records from the image data repository, to create an updated decodability MLM.

10. The barcode-reading system of claim 9, wherein the additional training is applied to the copy of the decodability MLM when the number of new image records that have been added to the image data repository since the decodability MLM was deployed exceeds a defined threshold value.

11. The barcode-reading system of claim 5, wherein the training engine is additionally executable by the at least one remote server processor to:
detect that the barcode-reading device is in an inactive state; and
replace the decodability MLM with an updated decodability MLM while the barcode-reading device is in the inactive state.

12. A system, comprising:
a barcode-decoding engine that comprises a barcode-decoding module;
an image data repository comprising a plurality of images processed by the barcode-decoding module and a plurality of decodability labels corresponding to the plurality of images, wherein a decodability label corresponding to an image indicates decodability of the image by the barcode-decoding module;
a training engine that is executable by at least one processor to train a decodability machine learning model (MLM), using the plurality of images and the plurality of decodability labels, to predict decodability of a new image by the barcode-decoding module; and
a deployment engine that is executable by the at least one processor to deploy the decodability MLM in a pre-decoding filter module in the barcode-decoding engine.

13. The system of claim 12, wherein the decodability label associated with a particular image indicates whether the barcode-decoding module was able to find a barcode in the particular image and successfully decode the barcode.

14. The system of claim 12, wherein:
the plurality of images are captured by a plurality of barcode-reading devices;
the barcode-decoding engine and the training engine run on at least one remote server device; and
the plurality of barcode-reading devices are communicatively coupled to the at least one remote server device via one or more computer networks.

15. The system of claim 14, wherein the plurality of barcode-reading devices are configured to send captured images to the barcode-decoding engine for decoding.

16. The system of claim 12, wherein the image data repository comprises a plurality of image records, wherein the plurality of image records comprise a training set and a testing set, and wherein the deployment engine is additionally executable by the at least one processor to:
evaluate performance of the decodability MLM using image records from the testing set; and
deploy the decodability MLM in the pre-decoding filter module only after the performance of the decodability MLM compares favorably to a defined performance metric.

17. A barcode-reading device, comprising:
a camera that is configured to capture images;
a processor;
memory that is communicatively coupled to the processor; and
a barcode-decoding engine stored in the memory, the barcode-decoding engine comprising:
a barcode-decoding module;
a pre-decoding filter module comprising a decodability machine learning model (MLM) that is configured to predict decodability of an image by the barcode-decoding module; and
a main module that is executable by the processor to provide an image captured by the camera to the pre-decoding filter module, receive a decoding prediction for the image from the pre-decoding filter module, and provide the image to the barcode-decoding module only if the decoding prediction indicates that the image is likely to be decodable by the barcode-decoding module.

18. The barcode-reading device of claim 17, wherein the main module is additionally executable by the processor to discard the image without sending the image to the barcode-decoding module if the decoding prediction indicates that the image is not likely to be decodable by the barcode-decoding module.

19. The barcode-reading device of claim 17, wherein the main module is additionally executable by the processor to repeatedly provide the image to the pre-decoding filter module until:

the decoding prediction indicates that the image is likely to be decodable by the barcode-decoding module; or the image has been processed N times by the pre-decoding filter module, wherein N is a positive integer greater than or equal to two.

20. The barcode-reading device of claim 19, wherein the main module is additionally executable by the processor to discard the image without sending the image to the barcode-decoding module if the image has been processed N times by the pre-decoding filter module and each decoding prediction generated by the pre-decoding filter module indicates that the image is not likely to be decodable by the barcode-decoding module.

\* \* \* \* \*